United States Patent [19]

Fujita

[11] 4,384,279
[45] May 17, 1983

[54] MODULAR LARGE SCALE IMAGE DISPLAY DEVICE

[75] Inventor: Shozoo Fujita, Nagasaki, Japan

[73] Assignee: Mitsubishi Denki Kabushiki Kaisha, Tokyo, Japan

[21] Appl. No.: 154,263

[22] Filed: May 29, 1980

[30] Foreign Application Priority Data

May 29, 1979 [JP] Japan .............................. 54-72984[U]

[51] Int. Cl.³ .............................................. G09G 3/00
[52] U.S. Cl. .............................. 340/815.20; 340/700; 40/573; 40/578
[58] Field of Search ........... 340/901, 703, 700, 366 E; 40/578, 447, 573, 605, 545, 577

[56] References Cited

U.S. PATENT DOCUMENTS

| | | | |
|---|---|---|---|
| 2,823,475 | 2/1958 | Packard | 40/573 |
| 3,407,331 | 10/1968 | Salgo | 340/703 |
| 3,590,508 | 7/1971 | Jones et al. | 40/573 |
| 3,594,761 | 7/1971 | Payne et al. | 340/366 E |
| 3,780,284 | 12/1973 | Dewhirst | 40/578 |
| 4,074,452 | 2/1978 | Bellinder | 40/573 |

Primary Examiner—Marshall M. Curtis
Attorney, Agent, or Firm—Sughrue, Mion, Zinn, Macpeak and Seas

[57] ABSTRACT

A large scale display device such as an advertising having display surface formed by arranging a number of image display tubes lengthwise and breadthwise. The device includes a frame having main posts and block-shaped face plates to each of which a number of image display tubes and a control unit are secured to form an assembly. The assemblies are piled one on another beginning with the lowest line in the frame and secured to the main posts with horizontal support members which are provided integrally on the back of each block-shaped face plates. Waterproofing putty or the like is filled in the gaps between the upper and lower junctions and the right and left junctions of adjacent block-shaped face plates.

6 Claims, 6 Drawing Figures

G: GREEN
B: BLUE
R: RED

G: GREEN
B: BLUE
R: RED

MODULAR LARGE SCALE IMAGE DISPLAY DEVICE

BACKGROUND OF THE INVENTION

The present invention relates to a large scale display device formed by an assembly of a number of image display tubes.

A conventional display device of this type, as shown in FIG. 1, includes image display tubes 1, block-shaped face plates 2 each having a number of image display tubes 1, and a frame 3 accommodating the face plates 2. A method of assembling the conventional display device will be described. For convenience in transportation, the image display section of the display device is divided into several blocks which are transported to a place where the display device is to be installed. In assembling these blocks, only the face plates are welded so that water will not enter the display device through the image display surface. The face plates are transported separately after the image display tubes and the control unit have been removed from the face plate. After the face plates have been assembled and welded, it is necessary to mount the image display tubes and the control units on the face plates again at the installation place. In order to improve the quality of a displayed image, the image display tube mounting pitch and arrangement are limited. Therefore, the configuration and dimensional errors of the junctions of adjacent block-shaped face plates are of great concern and accordingly the welding work at the installation place takes a great deal of labor and time.

SUMMARY OF THE INVENTION

Accordingly, an object of the invention is to provide a large scale display device which requires no welding work at a place where it is to be installed.

Another object of the invention is to provide a large scale display device in which it is unnecessary to remove a control unit from a block-shaped face plate before the device is shipped from the factory and accordingly it is unnecessary to assemble them at the place where the device is to be installed with the result that a number of working steps are eliminated and the manufacturing cost is reduced.

The foregoing objects and other objects of the invention have been achieved by the provision of a display device constituted by a number of image display tubes which are arranged lengthwise and breadthwise which includes a frame having main posts and block-shaped face plates to each of which a number of image display tubes and a control unit are secured to form an assembly. The assemblies are piled one on another beginning with the lowest line in the frame and secured to the main posts with horizontal support members which are provided integrally on the back of each block-shaped face plate. Waterproofing putty or the like is filled in the gaps between the upper and lower junctions and the right and left junctions of adjacent block-shaped face plates.

The nature, principle and utility of the invention will become more apparent from the following detailed description when read in conjunction with the accompanying drawings.

DESCRIPTION OF THE PREFERRED EMBODIMENTS

Figure 1:
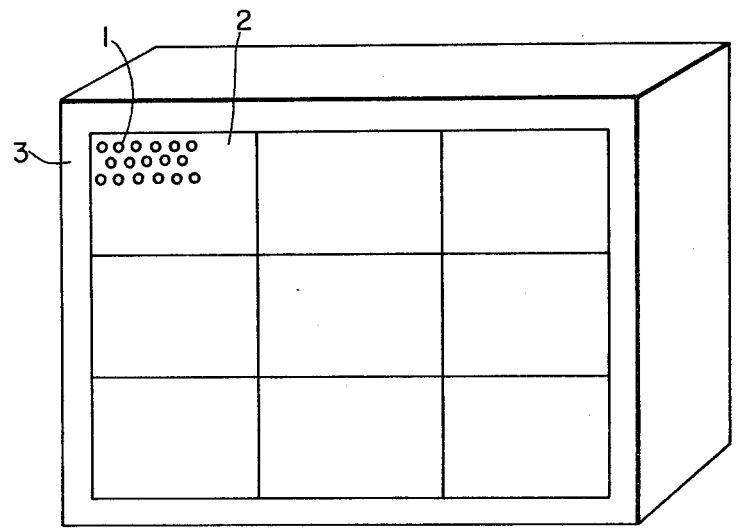
FIG. 1 is a perspective view of a conventional large scale display device.
Figure 2:
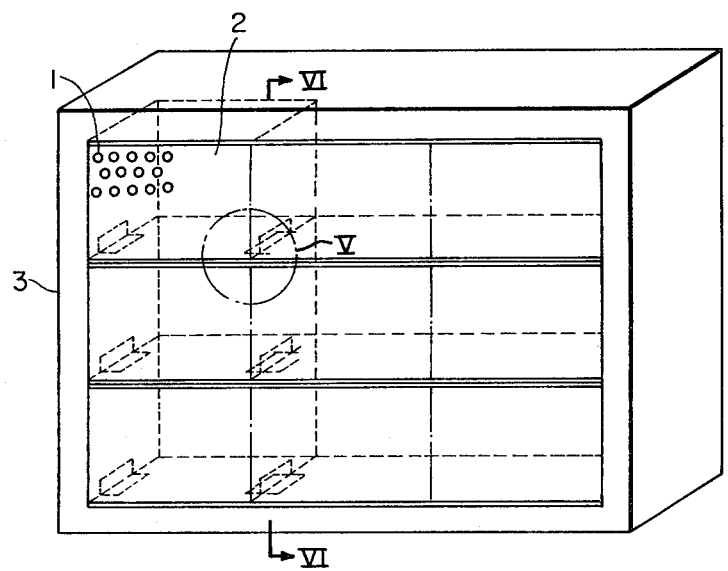
FIG. 2 is a perspective view of a preferred embodiment of a large scale display device constructed according to the invention.

A preferred embodiment of a large scale display device according to the invention, as shown in FIG. 2, includes image display tubes 1, block-shaped face plates 2 each having a number of image display tubes 1, and a frame 3 accommodating the face plates 2.

Figure 3:
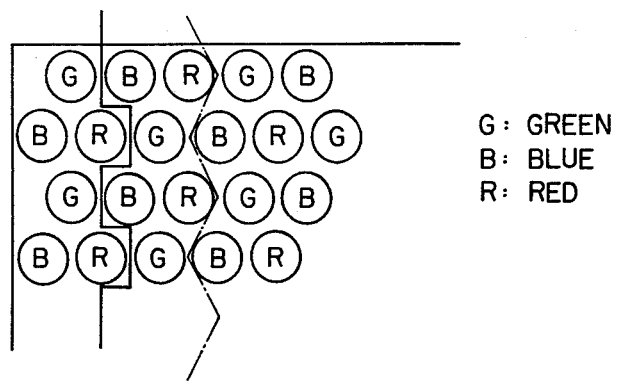
FIG. 3 is a schematic diagram illustrating one example of an arrangement of image display tubes on a face plate shown in FIG. 2.

FIG. 3 shows one example of an arrangement of image display tubes 1 on face plates 2 of a color display device where each picture element is constituted by three image display tubes for obtaining the three primary colors, red, green and blue which are necessary to reproduce a color images. As shown in FIG. 3, there are portions where no image display tubes are arranged at both right and left sides of the face plates 2. As a result, assuming that such face plates 2 are joined together, discontinuous portions of picture elements occur resulting in deterioration in reproduced picture quality. In view of the above, according to the invention, the sides of the face plates 2 are shaped as indicated by a solid line in FIG. 3.

Figure 5:
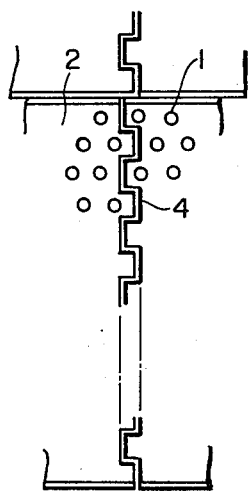
FIG. 5 is an enlarged view showing a portion V of FIG. 2 in more detail.

Adjacent face plates 2 are joined together as shown in FIG. 5 which shows a portion of FIG. 2 in more detail. As is clear from FIG. 5, both right and left sides of each face plate 2 are formed into right and left junctions in the form of a square wave. In FIG. 3, reference numeral 4 designates a gap formed between the right and left junctions of adjacent face plates 2.

In the above-described embodiment, the junctions of the face plates are bent outwardly. However, the same effect can be obtained by bending the junctions inwardly. Furthermore, both right and left sides of each face plate 2 may be formed into right and left junctions in the form of a sawtooth waveform as indicated by a dot and solid line in FIG. 3.

Figure 4:
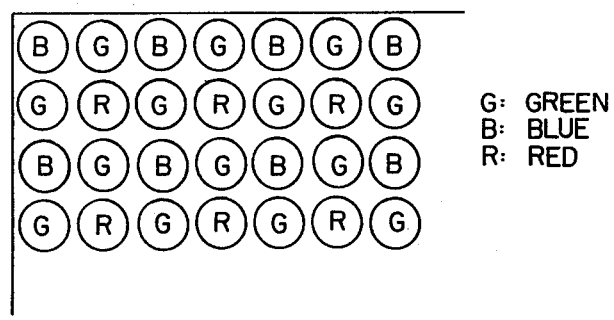
FIG. 4 is a schematic diagram illustrating another example of an arrangement of image display tubes on the face plate.

It should be noted that there is a tendency for green light to give a dark visual impression. Moreover, the eye's image resolution capability varies according to green light quantity. Taking the above facts into account, an arrangement of image display tubes as shown in FIG. 4 is preferred. In this case, conventional block-shaped face plates may be employed.

Figure 6:
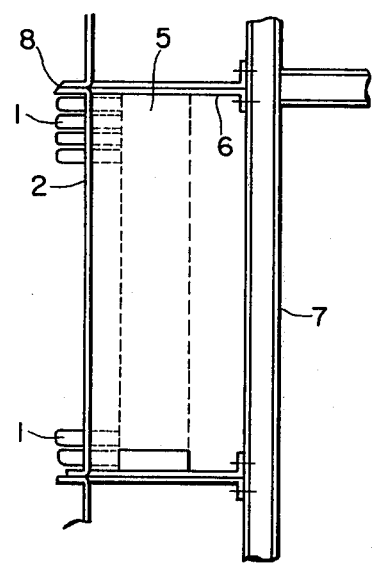
FIG. 6 is a sectional view taken along a line VI—VI in FIG. 2.

The arrangement of the large scale display device will become more apparent from FIG. 6 which is a sectional view taken along line VI—VI in FIG. 2. In FIG. 6, reference numeral 5 designates a control unit which is mounted on a corresponding face plate 2, element 6 denotes horizontal support members which are integrally mounted on the back of the face plate 2 with each support member 6 having a rear end portion fixedly secured to a main post of the display device, and element 8 identifies upper and lower junctions of each face plate which are used to join the face plates which are piled one on another.

When the large scale display device of the invention is installed at a desired place, a required number of assemblies each of which is constituted by a number of image display tubes 1, one control unit 5 and one face plate 2 are transported to the installation place. At the installation place, the various assemblies are laid one on another in the manner of building blocks beginning with the lowest line in the frame 3. The assemblies are fixedly secured to the main posts 7 by the horizontal support members 6. Thereafter, waterproofing putty or the like is filled in the gaps between the right and left junctions and between the upper and lower junctions so that no water can enter the display unit through the display surface formed by the face plates.

In the above-described embodiments, only right and left junctions of the face plates are bent inwardly or outwardly. However, the upper and lower junctions of the face plates may be shaped in the same manner to obtain the same effect.

Modifications are possible without departing from an essential scope of the invention.

What is claimed is:

1. A large scale display device having a display surface constituted by a number of image display tubes which are arranged lengthwise and breadthwise comprising:

a frame having vertical main posts; and block-shaped face plates to each of which a number of image display tubes and a control unit are secured to form an assembly, said face plates having horizontal support members;

said assemblies being stacked one on another beginning with a lowest line in said frame and said assemblies being secured to said main posts with said horizontal support members which are provided on the back of each block-shaped face plate.

2. The large scale display device as claimed in claim 1 wherein gaps between upper and lower junctions and between right and left junctions of adjacent block-shaped face plates are filled with waterproofing putty.

3. The large scale display device as claimed in claims 1 or 2 wherein said junctions of each block-shaped face plate are shaped so that said image display tubes are arranged uniformly on said display surface.

4. The large scale display device as claimed in claim 3 wherein said junctions of each block-shaped face plate are in the form of a square wave and wherein said junctions of adjacent block-shaped face plates are fitted into each other.

5. The large scale display device as claimed in claim 3 wherein said junctions of each block-shaped face plate are in the form of a zigzag wave and wherein said junctions of adjacent block-shaped face plates are fitted into each other.

6. The large display device as claimed in claim 1 wherein said horizontal support members are integral on the back of each block-shaped face plate.

* * * * *